(12) United States Patent
Fushimi et al.

(10) Patent No.: US 12,311,587 B2
(45) Date of Patent: May 27, 2025

(54) INJECTION MOLDING DEVICE AND MOLDING TOOL

(71) Applicant: SEIKO EPSON CORPORATION, Tokyo (JP)

(72) Inventors: Takuro Fushimi, Matsumoto (JP); Hiroyuki Kato, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 146 days.

(21) Appl. No.: 18/324,272

(22) Filed: May 26, 2023

(65) Prior Publication Data

US 2023/0382029 A1     Nov. 30, 2023

(30) Foreign Application Priority Data

May 31, 2022    (JP) ................... 2022-088295

(51) Int. Cl.
*B29C 45/78*     (2006.01)
*B29C 45/27*     (2006.01)
*B29C 45/73*     (2006.01)

(52) U.S. Cl.
CPC ...... *B29C 45/2708* (2013.01); *B29C 45/7312* (2013.01); *B29C 45/78* (2013.01); *B29C 2045/7343* (2013.01); *B29C 2945/76531* (2013.01)

(58) Field of Classification Search
None
See application file for complete search history.

(56) References Cited

U.S. PATENT DOCUMENTS

| | | | | |
|---|---|---|---|---|
| 4,359,435 A | * | 11/1982 | Kogure | ............... B29C 45/73 |
| | | | | 425/DIG. 11 |
| 5,545,366 A | | 8/1996 | Lust | |
| 2016/0279846 A1 | * | 9/2016 | Kong | ............... B29C 45/14 |

FOREIGN PATENT DOCUMENTS

| | | |
|---|---|---|
| JP | H06-328537 A | 11/1994 |
| JP | H07-227883 A | 8/1995 |
| JP | H08-001673 A | 1/1996 |

* cited by examiner

*Primary Examiner* — Thu Khanh T. Nguyen
(74) *Attorney, Agent, or Firm* — Harness, Dickey & Pierce, P.L.C.

(57) ABSTRACT

An injection molding device includes a stationary mold provided with a first gate opening, and a second gate opening, a movable mold configured to be mold-clamped against the stationary mold, a first hot runner configured to inject a first molding material in a cavity compartmented by the stationary mold and the movable mold, via the first gate opening, a second hot runner configured to inject a second molding material in the cavity via the second gate opening, and a cooler configured to cool the stationary mold. An end surface of the stationary mold opposed to the movable mold has a first region located between the first gate opening and the second gate opening, and a second region different from the first region. The cooler is configured so that a cooling performance with respect to the first region becomes higher than a cooling performance with respect to the second region.

8 Claims, 13 Drawing Sheets

INJECTION MOLDING DEVICE AND MOLDING TOOL

The present application is based on, and claims priority from JP Application Serial Number 2022-088295, filed May 31, 2022, the disclosure of which is hereby incorporated by reference herein in its entirety.

BACKGROUND

1. Technical Field

The present disclosure relates to an injection molding device and a molding tool.

2. Related Art

Regarding the injection molding deice, in JP-A-6-328537, there is disclosed a hot-runner metal mold for injection molding which has a cooling circuit for making a cooling medium flow therethrough disposed on an outer circumference of a gate bush having a gate to be an entrance to a cavity.

In Document 1, a configuration of the cooling circuit when a plurality of hot runners is arranged is not specifically studied. The inventors of the present application have found out the fact that when the plurality of hot runners is arranged as described above, an area in which the hot runners are close to each other out of the molding tool is apt to become high in temperature, and there is a possibility that the quality of a molded article is affected by the high temperature. Therefore, there has been desired a technology capable of appropriately cooling the area in which the hot runners are close to each other.

SUMMARY

According to a first aspect of the present disclosure, there is provided an injection molding device. The injection molding device includes a stationary mold provided with a first gate opening, and a second gate opening different from the first gate opening, a movable mold configured to be mold-clamped against the stationary mold, a first hot runner configured to inject a first molding material in a cavity compartmented by the stationary mold and the movable mold, via the first gate opening, a second hot runner configured to inject a second molding material in the cavity via the second gate opening, and a cooler configured to cool the stationary mold. An end surface opposed to the movable mold out of the stationary mold has a first region having a surface located between the first gate opening and the second gate opening out of the end surface, and a second region different from the first region when viewed along a mold clamping direction. The cooler is configured so that a cooling performance with respect to the first region becomes higher than a cooling performance with respect to the second region.

According to a second aspect of the present disclosure, there is provided a molding tool. The molding tool includes a stationary mold provided with a first gate opening, and a second gate opening different from the first gate opening, a movable mold, a first opening part configured so that a first hot runner configured to inject a first molding material in a cavity compartmented by the stationary mold and the movable mold, via the first gate opening, is inserted in the first opening part, a second opening part configured so that a second hot runner configured to inject a second molding material in the cavity via the second gate opening, is inserted in the second opening part, and a cooler configured to cool the stationary mold. An end surface close to the movable mold out of the stationary mold has a first region having a surface located between the first gate opening and the second gate opening out of the end surface, and a second region different from the first region when viewed along a mold clamping direction. The cooler is configured so that a cooling performance with respect to the first region becomes higher than a cooling performance with respect to the second region.

DESCRIPTION OF EXEMPLARY EMBODIMENTS

A. First Embodiment

Figure 1:
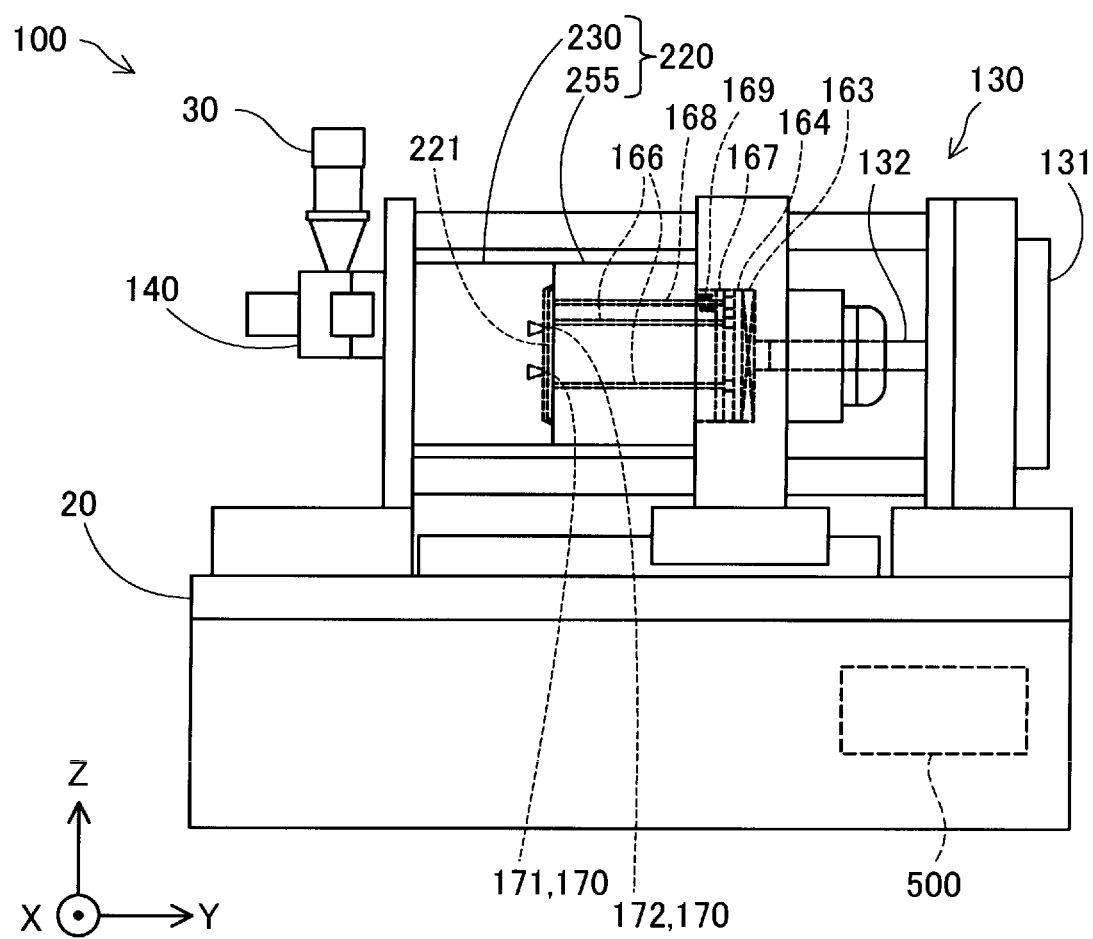
FIG. 1 is a front view showing a schematic configuration of an injection molding device according to a first embodiment.

FIG. 1 is a front view showing a schematic configuration of an injection molding device 100 according to a first embodiment. In FIG. 1, there are shown arrows respectively indicating X, Y, and Z directions perpendicular to each other. The X direction and the Y direction are directions parallel to a horizontal plane, and the Z direction is an opposite direction to a gravitational direction. X, Y, and Z directions shown in FIG. 2 and the subsequent drawings correspond respectively to the X, Y, and Z directions shown in FIG. 1. In the following description, when identifying a direction, positive/negative signs are used together with a directional expression defining a positive direction as a direction pointed by an arrow as "+," and a negative direction as an opposite direction to the direction pointed by the arrow as "−."

As shown in FIG. 1, the injection molding device 100 is provided with an injection unit 140 and a mold clamping device 130. The injection molding device 100 is a horizontal injection molding device, and the injection unit 140 and the mold clamping device 130 are arranged side by side in a horizontal direction. The injection unit 140 and the mold clamping device 130 are each fixed to a platform 20. The platform 20 is provided with a controller 500. The injection molding device 100 injects a molding material into a molding tool 220 attached to the mold clamping device 130 from the injection unit 140 to form a molding article.

In the present embodiment, the molding tool 220 made of metal is attached to the mold clamping device 130. The molding tool 220 to be attached to the mold clamping device 130 is not limited to one made of metal, and can also be one made of resin, or one made of ceramic. The molding tool 220 made of metal is called a metal mold. The molding tool 220 includes a stationary mold 230 and a movable mold 255. The stationary mold 230 is a mold which is fixed to the injection unit 140 when used, and the movable mold 255 is a mold which is configured to be able to move relatively to the stationary mold 230, and to be clamped together with the stationary mold 230. The stationary mold 230 is also referred to as a first mold or a female mold, and the movable mold 255 is also referred to as a second mold or a male mold.

The mold clamping device 130 has a function of performing opening/closing of the stationary mold 230 and the movable mold 255. The mold clamping device 130 drives a mold driver 131 formed of a motor to thereby rotate a ball screw 132 to move the movable mold 255 coupled to the ball screw 132 relatively to the stationary mold 230 to thereby open/close the molding tool 220 under the control by the controller 500. In other words, the stationary mold 230 is at rest in the injection molding device 100, and by the movable mold 255 moving relatively to the stationary mold 230 at rest, opening/closing of the molding tool 220 is performed. In the present embodiment, the movable mold 255 moves toward the −Y direction as a direction crossing a vertical direction to perform the mold clamping. The direction of the mold clamping, namely the direction in which the movable mold 255 moves with respect to the stationary mold 230, is also called a mold-clamping direction. The mold-clamping direction includes both of one direction and the opposite direction along the same axis.

In the movable molding 255, there is embedded one ejector pin 166 or a plurality of ejector pins 166. The ejector pin 166 is a rod-shaped member for separating the molded article molded in a cavity 221 from the movable mold 255 when moving the movable mold 255. The ejector pin 166 is disposed so as to be inserted through the movable mold 255 up to the cavity 221. A posterior end of the ejector pin 166 is supported by a support plate 167. A support rod 168 is fixed to the support plate 167, and the support rod 168 is inserted into a through hole provided to the movable mold 255. In the support rod 168, there is inserted a spring 169 arranged in a space between the movable mold 255 and the support plate 167. The spring 169 biases the support plate 167 so that a head portion of the ejector pin 166 forms a part of a wall surface of the cavity 221 when performing molding. To a surface at the ball screw 132 side of the support plate 167, there is fixed an extrusion plate 164. To a surface at the ball screw 132 side of the extrusion plate 164, there is attached a thrust bearing 163. It is possible for a head portion of the ball screw 132 to make contact with the thrust bearing 163. It should be noted that it is possible to use a thrust sliding bearing or the like instead of the thrust bearing 163.

To the injection unit 140, there is coupled a hopper 30 in which the material of the molded article is input. As the material of the molded article, there is used, for example, thermoplastic resin formed to have a pellet shape. As the thermoplastic resin, there is used, for example, ABS (acrylonitrile butadiene styrene), PC (polycarbonate), POM (polyacetal), PP (polypropylene), or PBT (polybutylene terephthalate). Supply of the material to the injection unit 140 can be performed via, for example, a tube through which the material is pressure-fed besides the hopper 30.

The injection unit 140 plasticizes at least a part of the material supplied from the hopper 30 to generate the molding material, and then injects the molding material to the cavity 221 compartmented between the stationary mold 230 and the movable mold 255. The term "plasticization" is a concept including melting, and means changing an object from a solid state to a state having fluidity. Specifically, in the case of a material in which glass transition occurs, the plasticization means that the temperature of the material is made equal to or higher than the glass-transition point. In the case of a material in which the glass transition does not occur, the plasticization means that the temperature of the material is made equal to or higher than the melting point.

Figure 2:
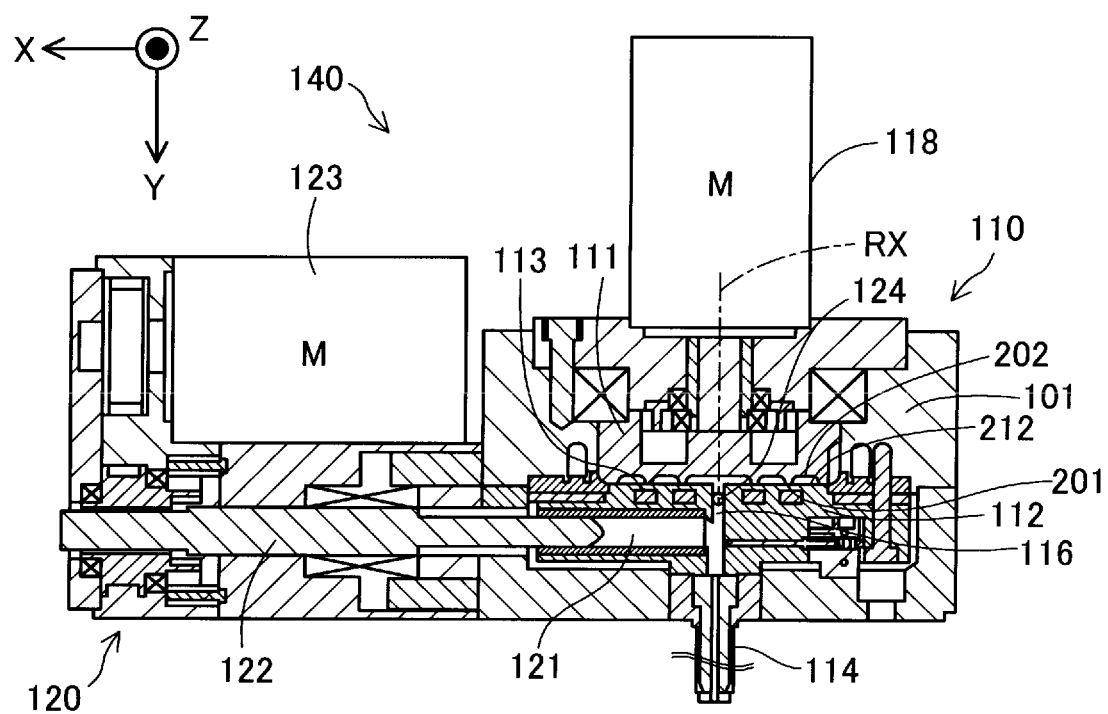
FIG. 2 is a cross-sectional view showing a schematic configuration of an injection unit.

FIG. 2 is a cross-sectional view showing a schematic configuration of the injection unit 140. In FIG. 2, each of the constituents is shown so that the +Y direction which points to the right in FIG. 1 points downward for the sake of convenience of illustration. The injection unit 140 is provided with a plasticizer 110, an injection control mechanism 120, and a nozzle 114.

The plasticizer 110 has a flat screw 111, a barrel 112, and heaters 113. The flat screw 111 is housed in a housing 101. The flat screw 111 is also called a rotor, or simply called a screw. The flat screw 111 is rotationally driven by a drive motor 118 in a housing 101 centering on a rotational axis RX. In the present embodiment, a direction of the rotational axis RX is parallel to the Y direction. At the center of the barrel 112, there is formed a communication hole 116. To the communication hole 116, there is coupled an injection cylinder 121 described later. The communication hole 116 is provided with a check valve 124 disposed upstream of the injection cylinder 121. The rotation of the flat screw 111 by the drive motor 118 and the heating by the heaters 113 are controlled by the controller 500.

Figure 3:
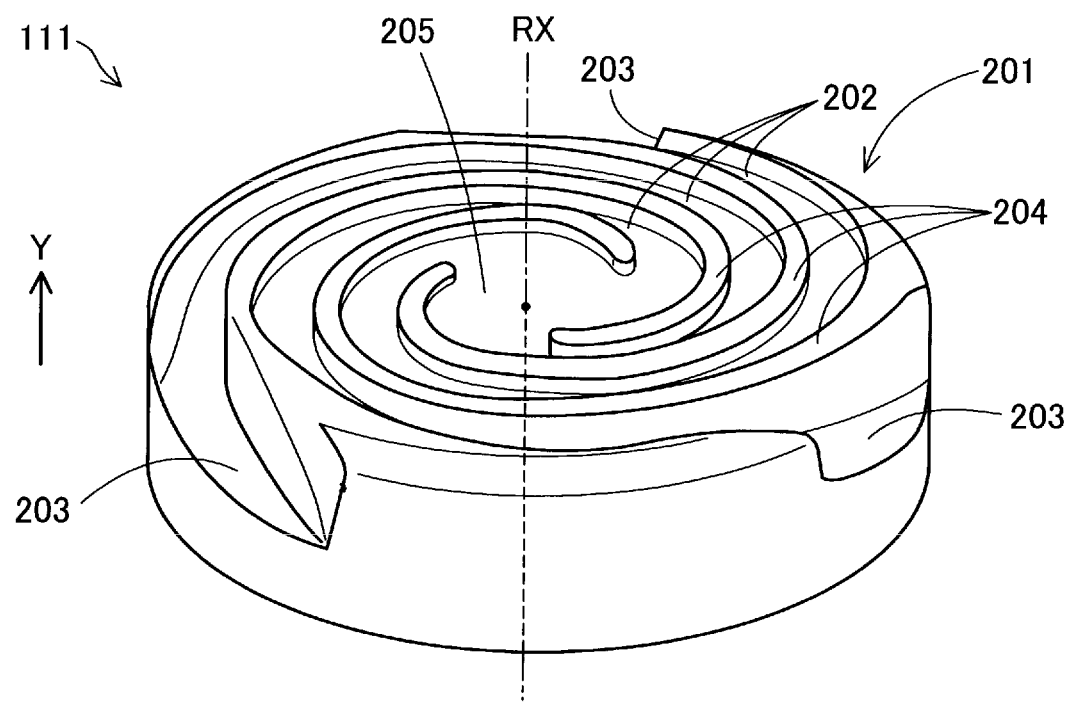
FIG. 3 is a perspective view showing a schematic configuration of a flat screw.

FIG. 3 is a perspective view showing a schematic configuration of the flat screw 111. The flat screw 111 has a substantially cylindrical shape smaller in height in a direction along a central axis thereof than the diameter. On a groove forming surface 201 opposed to the barrel 112 of the flat screw 111, there are formed grooves 202 each having a vortical shape centering on a central portion 205. The grooves 202 are communicated with respective material input ports 203 formed on a side surface of the flat screw 111. The material supplied from the hopper 30 is supplied to the grooves 202 through the material input ports 203. The grooves 202 are formed by being partitioned by convex lines 204. Although an example in which three grooves 202 are formed is shown in FIG. 3, the number of the grooves 202 can be one, or can also be two or more. The shape of the groove 202 is not limited to the vortical shape, and can be a spiral shape or an involute curve shape, or can also be a shape extending toward the outer circumference from the central portion so as to draw an arc.

Figure 4:
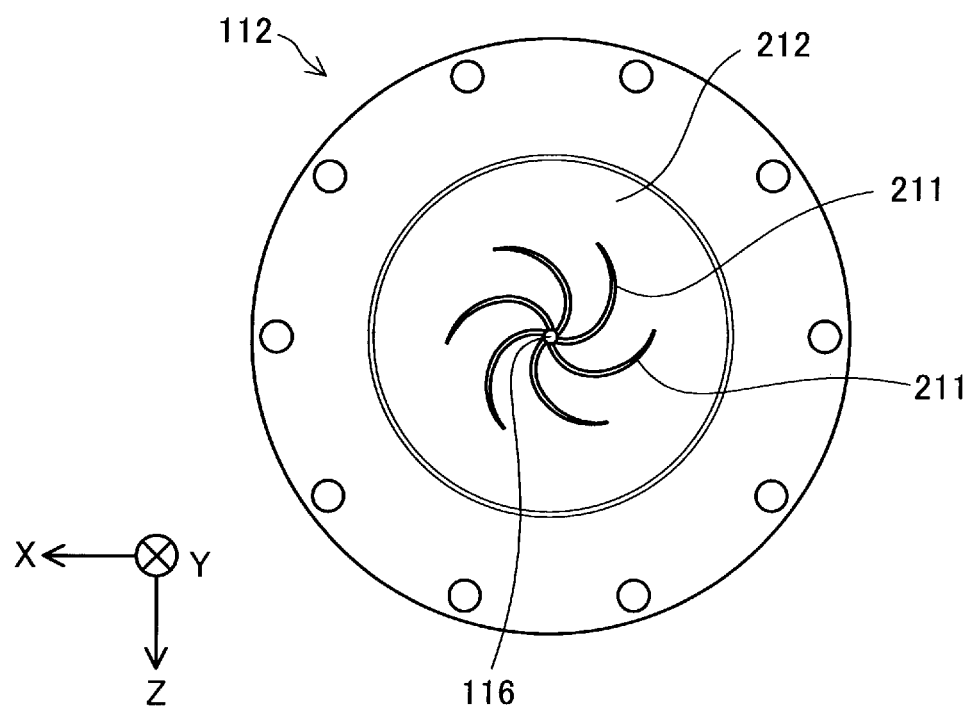
FIG. 4 is a schematic plan view of a barrel.

FIG. 4 is a schematic plan view of the barrel 112. The barrel 112 has an opposed surface 212 opposed to the groove forming surface 201 of the flat screw 111. At the center of the opposed surface 212, there is formed the communication hole 116. On the opposed surface 212, there is disposed a plurality of guide grooves 211 which is coupled to the communication hole 116, and which extends to form a vortical shape from the communication hole 116 toward the outer circumference. The material supplied to the grooves 202 of the flat screw 111 flows along the grooves 202 and the guide grooves 211 due to a rotation of the flat screw 111 while being plasticized between the flat screw 111 and the barrel 112 due to the rotation of the flat screw 111 and the heating by the heaters 113, and is guided to the central portion 205 of the flat screw 111. The material having flowed into the central portion 205 outflows to the injection control mechanism 120 from the communication hole 116 disposed at the center of the barrel 112. It should be noted that it is not required to provide the guide grooves 211 to the barrel 112. Further, the guide grooves 211 are not required to be coupled to the communication hole 116.

As shown in FIG. 2, the injection control mechanism 120 has the injection cylinder 121, a plunger 122, and a plunger driver 123. The injection control mechanism 120 has a function of injecting the molding material located in the injection cylinder 121 into the cavity 221. The injection control mechanism 120 controls an injection amount, injection speed, and injection pressure of the molding material from the nozzle 114 under the control by the controller 500. The injection cylinder 121 is a member having a substantially cylindrical shape coupled to the communication hole 116 of the barrel 112, and is provided with the plunger 122 inside. The plunger 122 slides inside the injection cylinder 121 to pressure-feed the molding material in the injection cylinder 121 to the nozzle 114 provided to the injection unit 140. Thus, the molding material is injected from the nozzle 114 to the molding tool 220. The plunger 122 is driven by the plunger driver 123 constituted by a motor.

As shown in FIG. 1, the stationary mold 230 is provided with gate openings 170. More particularly, the stationary mold 230 in the present embodiment is provided with totally six gate openings including a first gate opening 171 and a second gate opening 172 as the gate openings 170. In FIG. 1, the first gate opening 171 and the second opening 172 alone are schematically shown out of the six gate openings 170. The details of the gate openings 170 will be described later.

The controller 500 is formed of a computer provided with a single processor or a plurality of processors, a main storage device, and an input/output interface for performing input/output of a signal with the outside. By the processor reading a program on the main storage to execute the program, the controller 500 controls the injection unit 140 and the mold clamping device 130 to perform the manufacture of the molded article.

Figure 5:
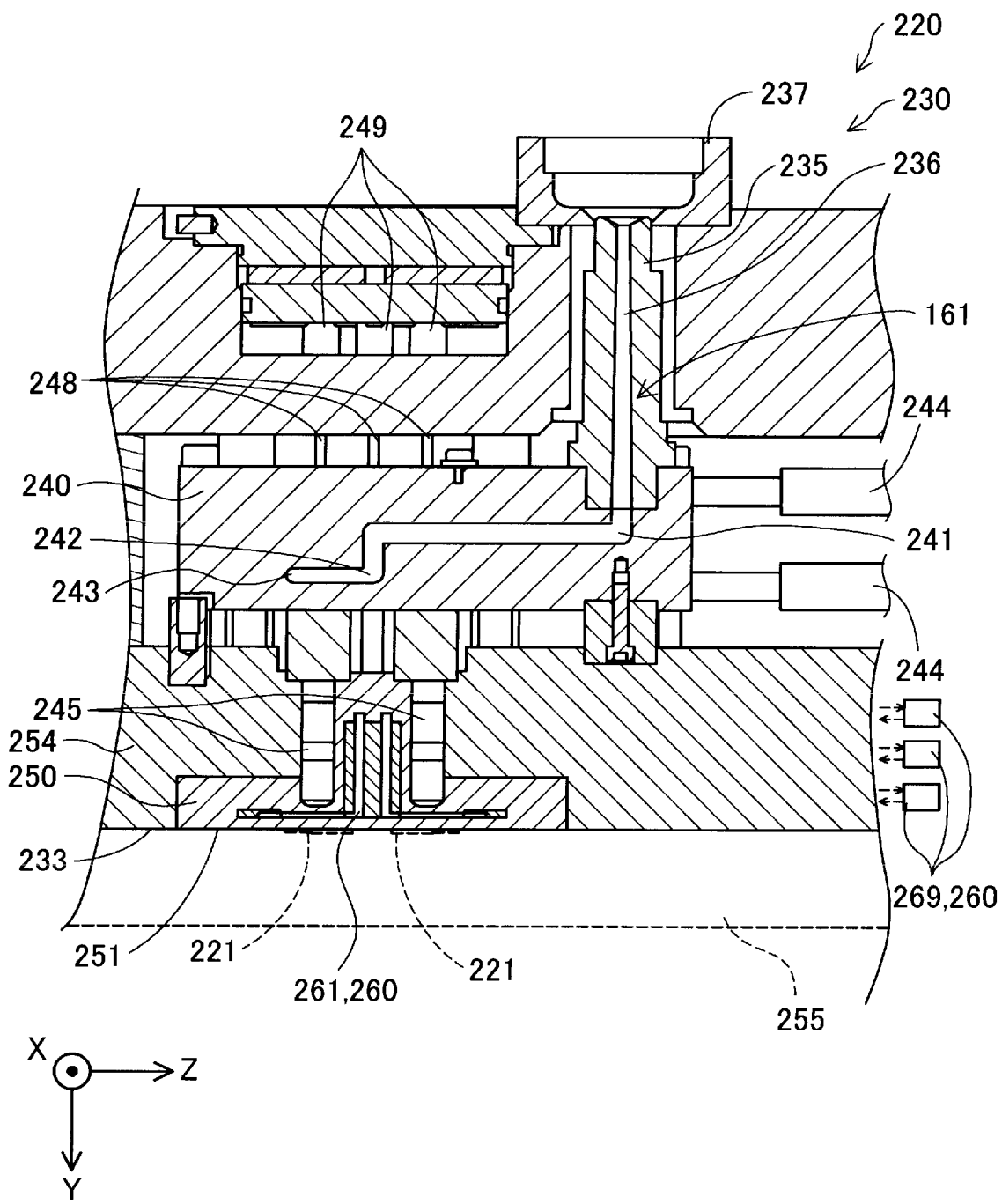
FIG. 5 is a cross-sectional view showing a schematic configuration of a molding tool.
Figure 6:
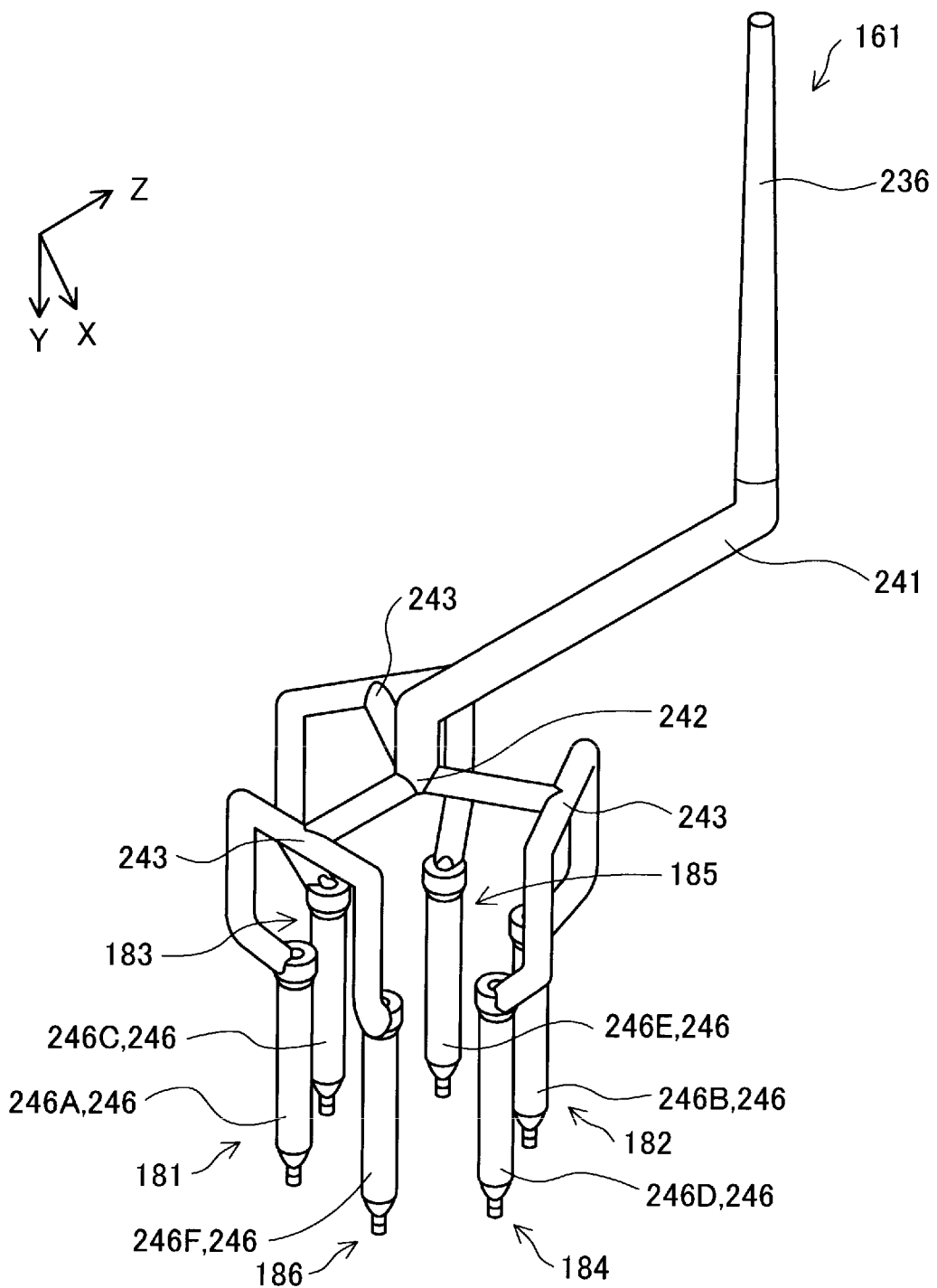
FIG. 6 is a schematic diagram showing an in-mold flow path.

FIG. 5 is a cross-sectional view showing a schematic configuration of the molding tool 220. FIG. 6 is a schematic diagram showing an in-mold flow path 161 located in the molding tool 220. The in-mold flow path 161 means a flow path of the molding material disposed in the stationary mold 230. The material injected in the molding tool 220 from the nozzle 114 of the injection unit 140 reaches the cavity 221 via the in-mold flow path 161. In the present embodiment, the in-mold flow path 161 is formed of a space such as a hole or a groove provided to a member constituting the stationary mold 230. FIG. 6 corresponds to a drawing schematically showing such an in-mold flow path 161 selectively from the stationary mold 230.

The molding tool 220 is configured as a hot-runner type molding tool. Therefore, the molding material in the in-mold flow path 161 is heated by the heaters provided to the stationary mold 230 to be kept in a state having fluidity. The in-mold flow path 161 is also called a "hot runner." Further, the "hot-runner type" is also called a "runnerless type."

The stationary mold 230 in the present embodiment has a sprue bush 235, a manifold part 240, six nozzle chips 245, and a cavity plate 254.

Inside the sprue bush 235, there is formed a sprue 236 extending along the Y direction. The sprue 236 forms an end portion at an entrance side of the in-mold flow path 161. An end at the −Y direction side of the sprue 236 corresponds to a starting end of the in-mold flow path 161. An end portion at the +Y direction side of the sprue 236 is coupled to a manifold flow path 241 located inside the manifold part 240 described later. A tip of the nozzle 114 of the injection unit 140 makes contact with the end at the −Y direction side of the sprue 236. At the −Y direction side of the sprue bush 235, a locating ring 237 for positioning the injection unit 140 to the stationary mold 230 is fixed.

The manifold part 240 is arranged in the +Y direction of the sprue bush 235, and is fixed to the sprue bush 235. Inside the manifold part 240, there is formed the manifold flow path 241. As described above, a starting end of the manifold flow path 241 is coupled to the sprue 236. The manifold flow path 241 forms a part of the in-mold flow path 161, and functions as a flow path for distributing the molding material having flowed in the molding tool 220 from the nozzle 114 to the nozzle chips 245. More particularly, the manifold flow path 241 extends from an end at the sprue 236 side to a first branch point 242, and is then branched at the first branch point 242 into three flow paths extending respective directions different from each other. Further, the flow paths thus branched each extend to a second branch point 243, and are each branched at the second branch point 243 into two flow paths extending in respective directions different from each other. The totally six flow paths branched in such a manner are respectively coupled to chip flow paths 246 located in the respective nozzle chips 245. The molding material in the manifold flow path 241 is heated by cartridge heaters 244 inserted in the manifold part 240.

Figure 7:
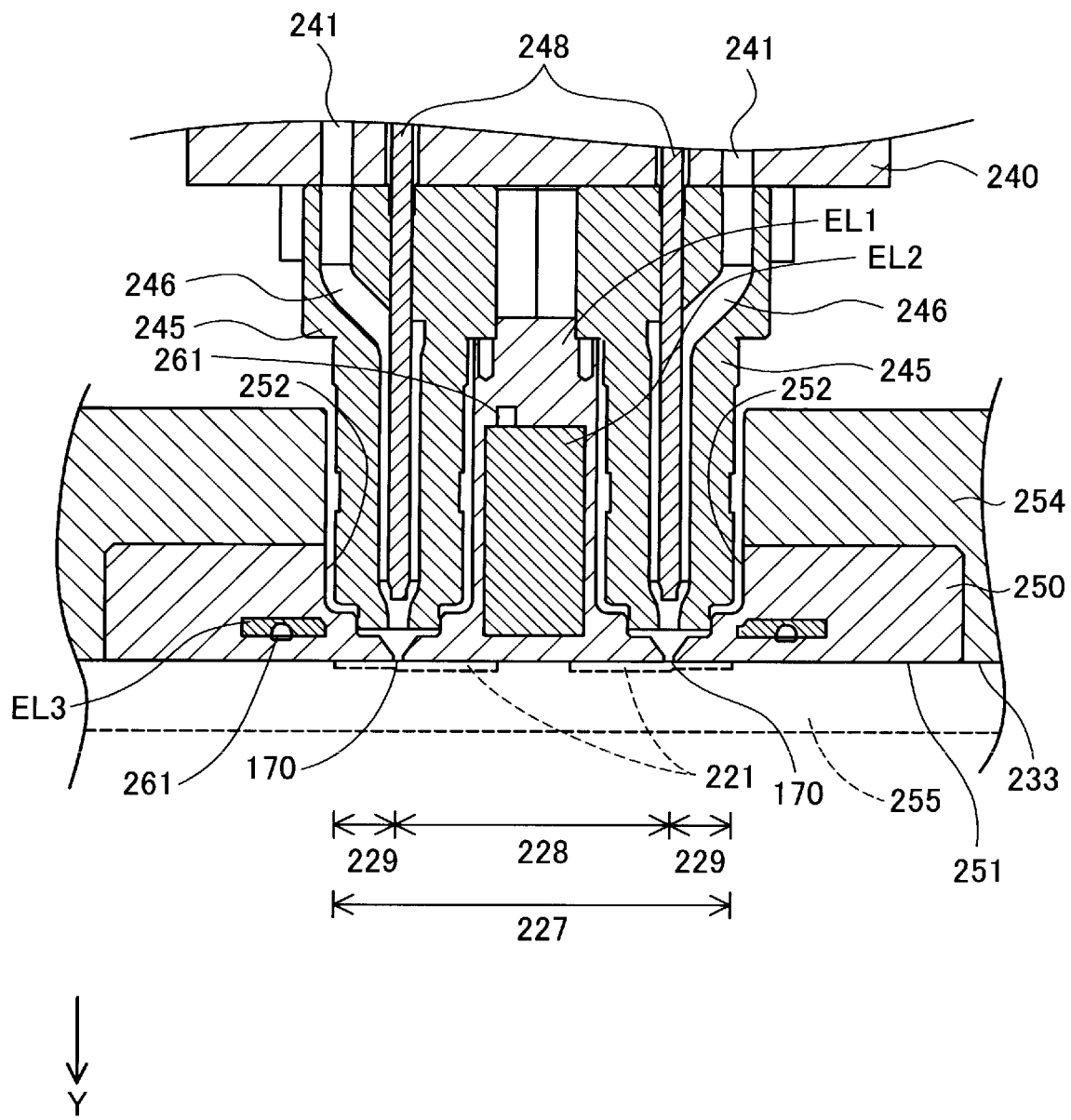
FIG. 7 is a diagram showing a cross-section of nozzle chips and a cooling plate.

FIG. 7 is a diagram showing a cross-section of the nozzle chips 245 and a cooling plate 250. The cross-section shown in FIG. 7 shows a cross-section in a direction different from the cross-section shown in FIG. 5. As shown in FIG. 5 and FIG. 7, each of the nozzle chips 245 is arranged at the +Y direction side of the manifold part 240, and is fixed to the manifold part 240. In the present embodiment, each of the nozzle chips 245 is configured as a valve-gate type hot-runner nozzle, and a chip flow path 246 located inside each of the nozzle chips 245 is opened/closed by an action of a valve pin 248 shown in FIG. 5. The valve pin 248 operates in accordance with drive of a pin driver 249 under the control by the controller 500. The pin driver 249 is constituted by a cylinder of, for example, an air type, a hydraulic type, or an electric type. In another embodiment, the nozzle chip 245 can be configured as, for example, an open-gate type hot-runner nozzle.

The chip flow path 246 forms a terminal portion of the in-mold flow path 161. The chip flow paths 246 formed inside the respective nozzle chips 245 are called a first chip flow path 246A, a second chip flow path 246B, a third chip flow path 246C, a fourth chip flow path 246D, a fifth chip flow path 246E, and a sixth chip flow path 246F, respectively.

As shown in FIG. 5 and FIG. 7, the cavity plate 254 is arranged at the +Y direction side of the manifold part 240. The nozzle chips 245 are coupled and fixed to the cavity plate 254. The cavity plate 254 forms an end portion of the stationary mold 230 wherein the end portion includes an end surface 233 close to the movable mold 255. The end surface 233 includes a cavity compartment surface 227. The cavity compartment surface 227 is a portion of compartmenting the cavity 221 out of the end surface 233, namely a surface of compartmenting the cavity 221 out of the end surface 233.

The cavity plate 254 in the present embodiment has the cooling plate 250. As shown in FIG. 5 and FIG. 7, the cooling plate 250 is arranged at the +Y direction side of the nozzle chip 245. In the present embodiment, a plate end surface 251 as an end surface at the +Y direction side of the cooling plate 250 forms a portion including the cavity compartment surface 227 out of the end surface 233 of the stationary mold 230 described above.

Figure 8:
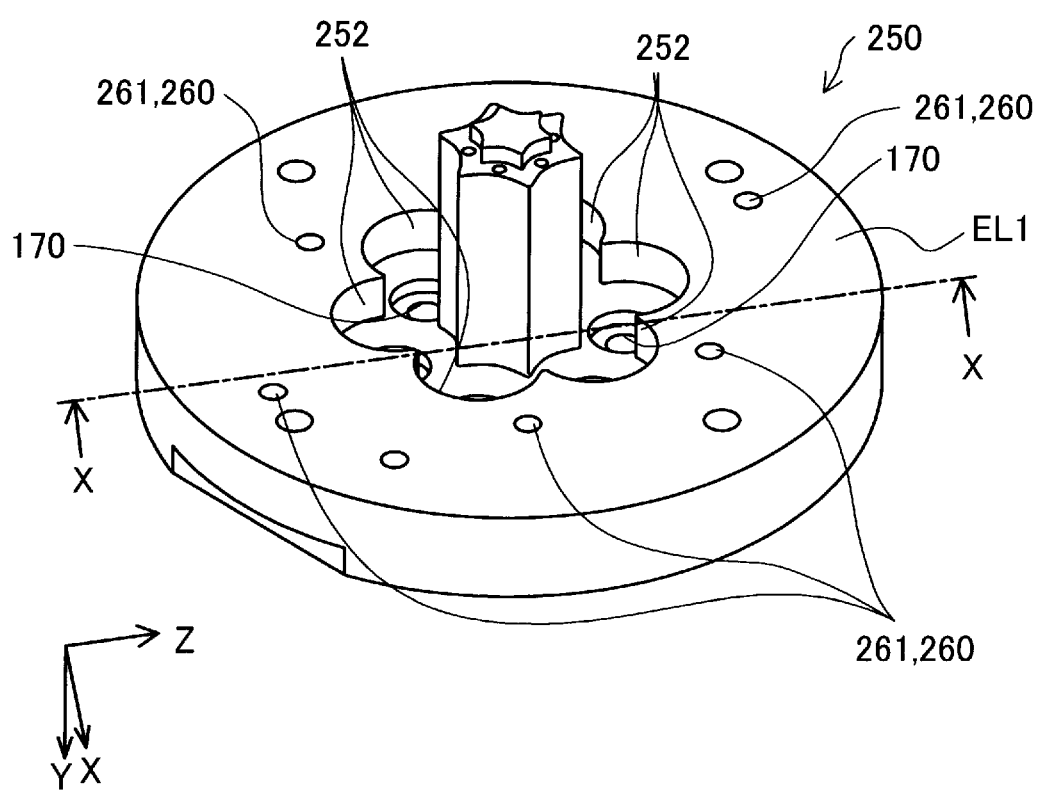
FIG. 8 is a perspective view showing the cooling plate.

FIG. 8 is a perspective view showing the cooling plate 250 in the present embodiment. As shown in FIG. 8, the cooling plate 250 in the present embodiment has a substantially cylindrical shape as a whole, and is arranged so that the axial direction thereof becomes parallel to the Y direction.

Figure 9:
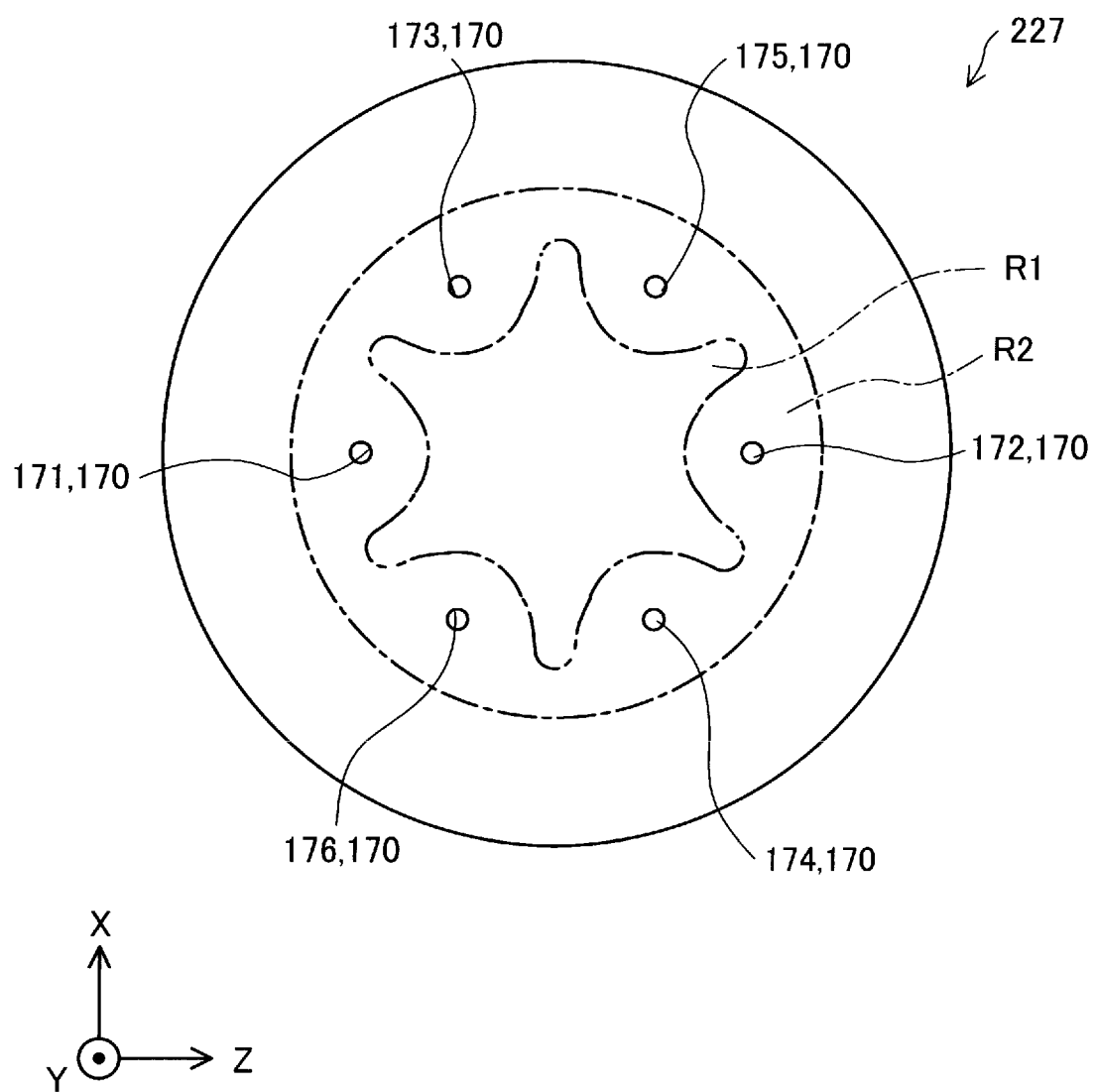
FIG. 9 is a plan view showing a cavity compartment surface.

FIG. 9 is a plan view showing the cavity compartment surface 227. FIG. 9 shows an appearance of the cavity compartment surface 227 viewed in the −Y direction. As shown in FIG. 9, the cavity compartment surface 227 is provided with the first gate opening 171, the second gate opening 172, a third gate opening 173, a fourth gate opening 174, a fifth gate opening 175, and a sixth gate opening 176 as the gate openings 170 described above. More particularly, as shown in FIG. 7 and FIG. 8, the cooling plate 250 is provided with six hollow parts 252 penetrating the cooling plate 250 in the Y direction so as to correspond respectively to the nozzle chips 245, and an opening part at the +Y direction side of each of the hollow parts 252 forms each of the gate openings 170. In the hollow parts 252, there are respectively inserted tip portions at the +Y direction side of the respective nozzle chips 245. In the present embodiment, the first gate opening 171 through the sixth gate opening 176 are communicated with the same cavity 221.

As shown in FIG. 9, in the present embodiment, the gate openings 170 are arranged so that the gate openings 170 respectively form vertexes of a substantially regular hexagon when viewed along the −Y direction. The first gate opening 171 is arranged at the extreme −Z direction side out of the gate openings 170. The second gate opening 172 is arranged at the extreme +Z direction side out of the gate openings 170, and is arranged the farthest from the first gate opening 171. The third gate opening 173 is arranged at the +Z direction side and at the +X direction side of the first gate opening 171 so as to be adjacent to the first gate opening 171. The fourth gate opening 174 is arranged so as to be the farthest from the third gate opening 173 out of the gate openings 170. The fifth gate opening 175 is arranged at the +Z direction side of the third gate opening 173 so as to be adjacent to the third gate opening 173. The sixth gate opening 176 is arranged so as to be the farthest from the fifth gate opening 175 out of the gate openings 170.

In the present embodiment, the first chip flow path 246A shown in FIG. 6 forms a first hot runner 181, and the second chip flow path 246B forms a second hot runner 182. The first hot runner 181 injects a first molding material as the molding material to the cavity 221 via the first gate opening 171. The second hot runner 182 injects a second molding material as the molding material to the cavity 221 via the second gate opening 172. Similarly, the third chip flow path 246C, the fourth chip flow path 246D, the fifth chip flow path 246E, and the sixth chip flow path 246F respectively form the third hot runner 183, the fourth hot runner 184, the fifth hot runner 185, and the sixth hot runner 186. The third hot runner 183 through the sixth hot runner 186 inject a third molding material through a sixth molding material as the molding material to the cavity 221 via the third gate opening 173 through the sixth gate opening 176, respectively. In the present embodiment, the first molding material through the sixth molding material are the same in material as each other.

In the present embodiment, it can be said that the hollow parts 252 described above are opening parts configured so that the first hot runner 181 through the sixth hot runner 186 can respectively be inserted in the opening parts. As described above, the opening part configured so that the first hot runner 181 can be inserted in the opening part is also referred to as a first opening part, and the opening part configured so that the second hot runner 182 can be inserted in the opening part is also referred to as a second opening part.

Figure 10:
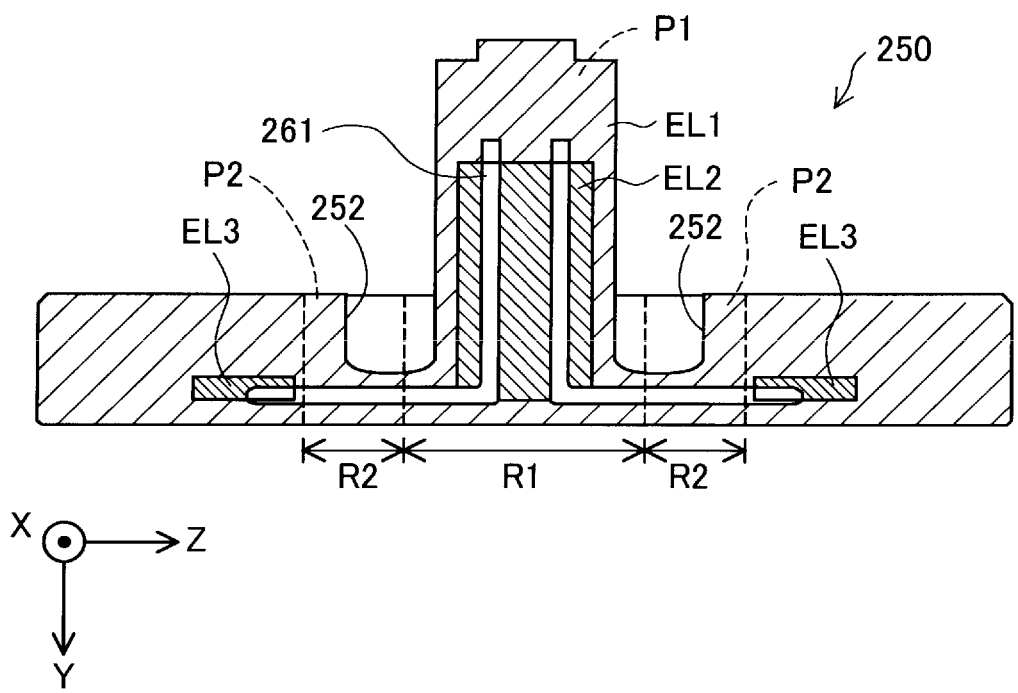
FIG. 10 is a diagram showing an X-X cross-section in FIG. 8.

FIG. 10 is a diagram showing an X-X cross-section in FIG. 8. As shown in FIG. 5, FIG. 8, and FIG. 10, the molding tool 220 is provided with a cooler 260 for cooling the stationary mold 230. The cooler 260 in the present embodiment has cooling flow paths 261 through which a cooling medium flows, and cooling medium suppliers 269 shown in FIG. 5 for supplying the cooling flow paths 261 with the cooling medium. In the present embodiment, the cooling flow paths 261 are provided to the cooling plate 250. More particularly, the cooling flow paths 261 are each formed of a space part such as a hole or a groove provided to the cooling plate 250. The cooling medium suppliers 269 are configured as a chiller for circulating the cooling medium through the cooling flow paths 261 while cooling the cooling medium, and are coupled to entrance parts and exit parts of the cooling flow paths 261. The cooling medium suppliers 269 are controlled by the controller 500.

Figure 11:
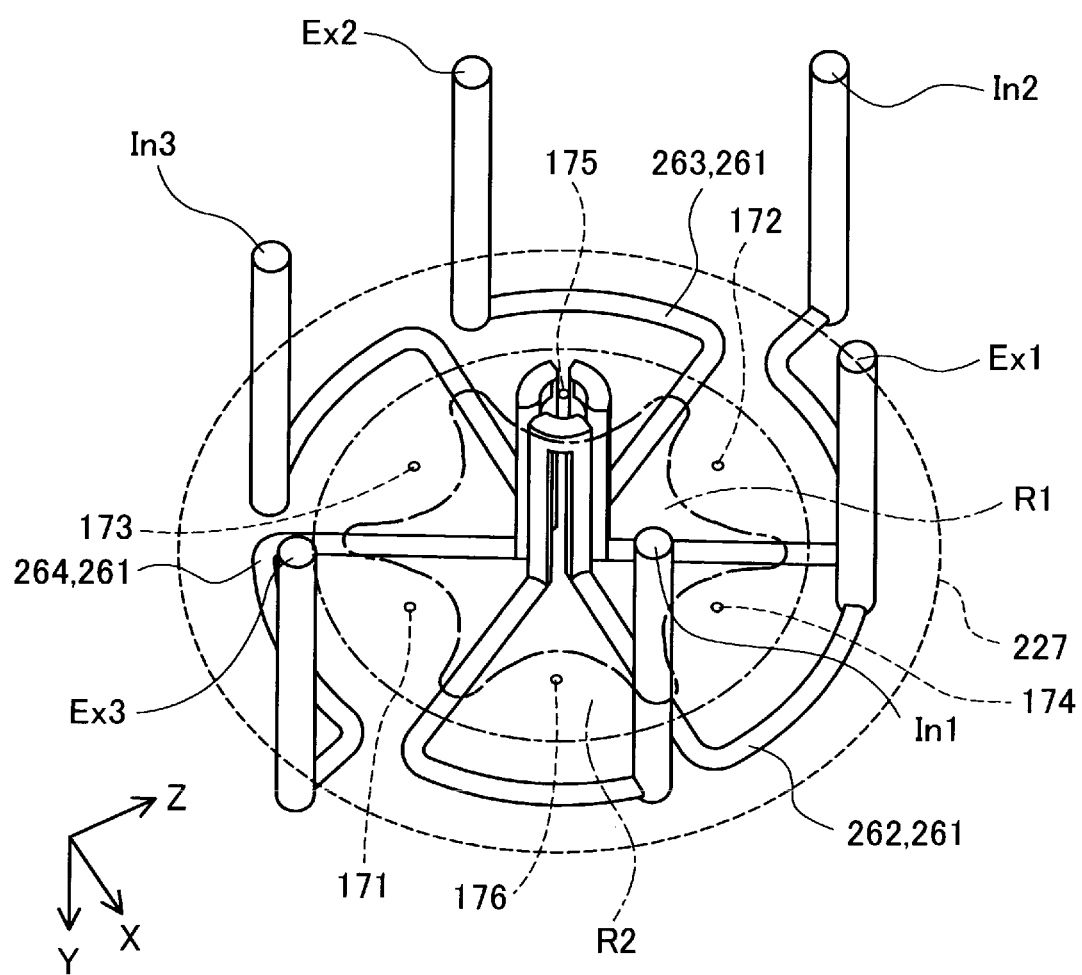
FIG. 11 is a diagram for explaining an arrangement of cooling flow paths in the first embodiment.

FIG. 11 is a diagram for explaining an arrangement of the cooling flow paths 261 in the present embodiment. FIG. 11 schematically shows the cooling flow path 261 formed inside the cooling plate 250 in a selective manner. Further, FIG. 11 schematically shows the cavity compartment surface 227, and the first gate opening 171 through the sixth gate opening 176.

The cooler 260 in the present embodiment has a plurality of cooling flow paths 261. As shown in FIG. 11, in the present embodiment, the cooler 260 has a first cooling flow path 262, a second cooling flow path 263, and a third cooling flow path 264 as the cooling flow paths 261. The cooling flow paths 261 have the respective entrance parts different from each other, and the respective exit parts different from each other, and are independent of each other without being communicated with each other. More particularly, the first cooling flow path 262 has a first entrance part In1 and a first exit part Ex1. The second cooling flow path 263 has a second entrance part In2 and a second exit part Ex2. The third cooling flow path 264 has a third entrance part In3 and a third exit part Ex3. Further, the entrance part and the exit part of each of the cooling flow paths 261 are coupled to the respective cooling medium suppliers 269 different from each other. The cooling medium suppliers 269 are each controlled individually by the controller 500.

Figure 12:
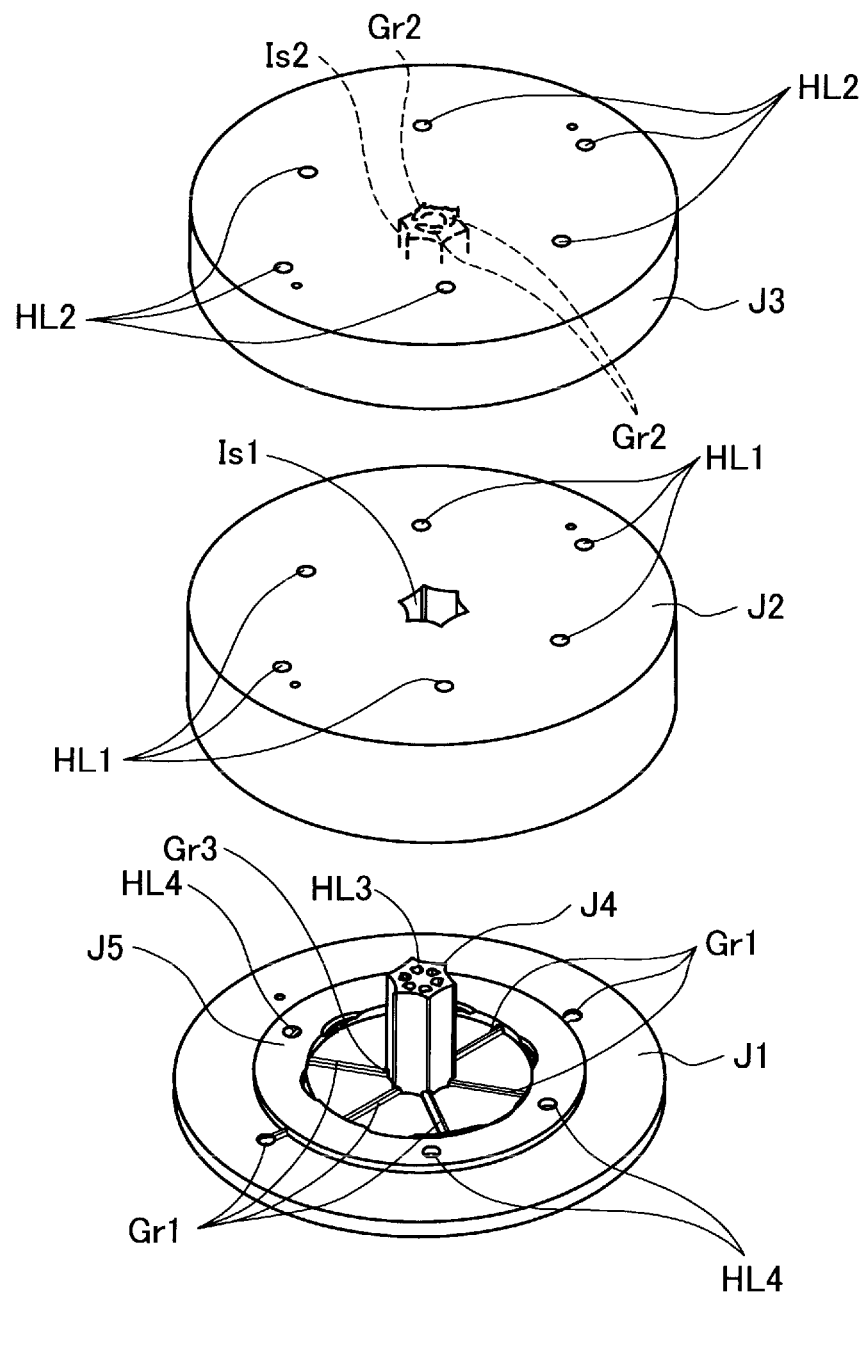
FIG. 12 is an explanatory diagram showing a condition in the middle of a manufacturing process of the cooling plate.

FIG. 12 is an explanatory diagram showing a condition in the middle of a manufacturing process of the cooling plate 250 in the present embodiment. As shown in FIG. 12, in the present embodiment, the cooling plate 250 is manufactured through a step of forming the hollow parts 252 described above, a step of grinding an unnecessary portion, and so on after a plurality of members provided with groove parts and holes for forming the cooling flow paths 261 is bonded to each other with metal joining.

FIG. 12 shows a first bonding member J1 through a fifth bonding member J5 for forming the cooling plate 250. The first bonding member J1 through the third bonding member J3 are formed of stainless steel. The first bonding member J1 has a substantially disk-like shape, and is provided with groove parts Gr1 formed on one surface thereof. The second bonding member J2 and the third bonding member J3 each have a substantially columnar shape. The second bonding member J2 is provided with six holes HL1 for forming the cooling flow paths 261, and a hole Is1 in which the fourth bonding member J4 is inserted. The hole Is1 and the holes HL1 are each a through hole penetrating the second bonding member J2 along the axial direction thereof. The third bonding member J3 is provided with six holes HL2, and a hole Is2 in which a tip portion of the fourth bonding member J4 is inserted. The hole Is2 has a starting end portion on one bottom surface of the third bonding member J3, and has a terminal portion between bottom surfaces of the third bonding member J3. In the terminal portion of the hole Is2, there are formed groove parts Gr2. The holes HL2 are each a through hole penetrating the third bonding member J3 along the axial direction thereof. It should be noted that the portion provided with the six holes HL2 of the third bonding member J3 is removed in a grinding step after the first bonding member J1 through the fifth bonding member J5 are metal-joined.

The fourth bonding member J4 and the fifth bonding member J5 are formed of copper. The fourth bonding member J4 has a substantially hexagonal column shape. The fourth bonding member J4 is provided with six holes HL3 for forming the cooling flow paths 261. The holes HL3 are each a through hole penetrating the fourth bonding member J4 along the axial direction thereof. By the tip portion of the fourth bonding member J4 being inserted in the hole Is2 of the third bonding member J3 described above, the two holes HL3 adjacent to each other are coupled to each other with the groove part Gr2 of the third bonding member J3. Further, in an end portion at an opposite side to the tip portion of the fourth bonding member J4, there is formed a groove part Gr3 communicated with the holes HL3. The groove part Gr3 compartments a part of the cooling flow paths 261 together with the groove parts Gr1 provided to the first bonding member J1. The fifth bonding member J5 is formed to have a disk-like shape having an opening in a central portion. The fifth bonding member J5 is provided with four holes HL4 for forming the cooling flow paths 261. It should be noted that in FIG. 12, three holes HL4 are only shown out of the four holes HL4. Further, a surface not shown of the fifth bonding member J5 is provided with groove parts not shown. The groove parts provided to the fifth bonding member J5 compartment a part of the cooling flow paths 261 together with the groove parts Gr1.

As shown in FIG. 12, the fourth bonding member J4 and the fifth bonding member J5 are stacked on a surface provided with the groove parts Gr1 of the first bonding member J1. The second bonding member J2 is stacked on the first bonding member J1 and the fifth bonding member J5 in a state in which the fourth bonding member J4 is inserted in the hole Is1. The third bonding member J3 is stacked on the second bonding member J2 in a state in which the fourth bonding member J4 is inserted in the hole Is2. The first bonding member J1 through the fifth bonding member J5 are stacked in such a manner, and are then metal-joined. Thus, as shown in FIG. 10, a second member EL2 and a third member EL3 made of copper are incorporated in a first member EL1 made of stainless steel formed by integrating the first bonding member J1 through the third bonding member J3 with each other. The second member EL2 corresponds to the fourth bonding member J4 incorporated in the first member EL1, and the third member EL3 corresponds to the fifth bonding member J5 incorporated in the first member EL1. Further, the cooling flow paths 261 are provided to the cooling plate 250 using the groove parts and the holes provided to the first bonding member J1 through the fifth bonding member J5.

As shown in FIG. 9 through FIG. 11, the end surface 233 has a portion between the first gate opening 171 and the second gate opening 172 out of the end surface 233 when viewed along the −Y direction, namely a first region R1 having a surface between the first gate opening 171 and the second gate opening 172 out of the end surface 233, and a second region R2 different from the first region R1. In the present embodiment, the first region R1 has a surface between the first gate opening 171 and the third gate opening 173 through the sixth gate opening 176 in addition to the surface between the first gate opening 171 and the second gate opening 172. More particularly, the first region R1 includes halfway points between the first gate opening 171 and the second gate opening 172 through the sixth gate opening 176. The halfway point means a midpoint of a line segment connecting two points on the end surface 233. Thus, the first region R1 in the present embodiment includes a portion inside an area obtained by connecting the gate openings 170, namely an area inside the substantially regular hexagon the vertexes of which are constituted by the gate openings 170. The second region R2 in the present embodiment is an area which surrounds an outer circumference of the first region R1 when viewed along the −Y direction.

The cooler 260 is configured so that the cooling performance with respect to the first region R1 becomes higher than the cooling performance with respect to the second region R2. In the present embodiment, when being projected on a surface perpendicular to the Y direction, by more thickly arranging portions which overlap the first region R1 of the cooling flow paths 261 than portions which overlap the second region R2 of the cooling flow paths 261, it is realized that the cooling performance of cooling the first region R1 is higher than cooling performance of cooling the second region R2. More particularly, when being projected on the surface perpendicular to the Y direction, the cooling flow paths 261 are arranged so that a proportion of the area of the portions overlapping the first region R1 of the cooling flow paths 261 to the area of the first region R1 becomes higher than a proportion of the area of the portions overlapping the second region R2 of the cooling flow paths 261 to the area of the second region R2. Thus, in the present embodiment, when cooling the stationary mold 230 using the cooler 260, the highest temperature in the first region R1 becomes lower than the highest temperature in the second region R2. The degree of thickness of the cooling flow paths 261 in the first region R1 or the second region R2 is hereinafter also called a "density" of the cooling flow paths 261 in that region. The density of the cooling flow paths 261 in a certain region becomes higher by, for example, increasing the number of the cooling flow paths 261 in the portions overlapping that region, or increasing the flow path cross-sectional area out of the cavity plate 254.

It should be noted that in the present embodiment, the cooling flow paths 261 are arranged so that the arrangement density of the cooling flow paths 261 in the portions overlapping the first region R1 when viewed along the Y direction becomes higher than the arrangement density of the cooling flow paths 261 in the portions overlapping the second region R2 out of the cavity plate 254. The arrangement density of the cooling flow paths 261 in a certain portion means a proportion of a volume of the cooling flow paths 261 arranged in that portion to the volume of that portion. The arrangement density of the cooling flow paths 261 in a certain portion becomes higher by, for example, increasing the number of the cooling flow paths 261 in that portion, or increasing the flow path cross-sectional area.

In the present embodiment, out of the portion cooled by the cooler 260 of the stationary mold 230, at least a part of the portions overlapping the first region R1 is formed of a member having higher thermal conductivity than that of the member forming the portions overlapping the second region R2. More particularly, in the present embodiment, as shown in FIG. 10, a portion P2 overlapping the second region R2 of the cooling plate 250 is formed of the first member EL1, namely stainless steel. A protrusion portion P1 overlapping the first region R1 of the cooling plate 250 has a portion formed of the first member EL1 and a portion formed of the second member EL2. In other words, the protrusion portion P1 has the portion formed of stainless steel, and the portion formed of copper having higher thermal conductivity than that of stainless steel. Thus, the protrusion portion P1 becomes easy to be cooled by the cooling medium in the cooling flow paths 261. In particular, in the present embodiment, since the cooling flow paths 261 are formed in the second member EL2, the protrusion portion P1 becomes easier to be cooled.

As shown in FIG. 7, in the present embodiment, the cavity compartment surface 227 has a first surface 228 and a second surface 229. The second surface 229 means a surface closer to the movable mold 255 when the mold clamping is performed than the first surface 228 out of the cavity compartment surface 227.

Figure 13:
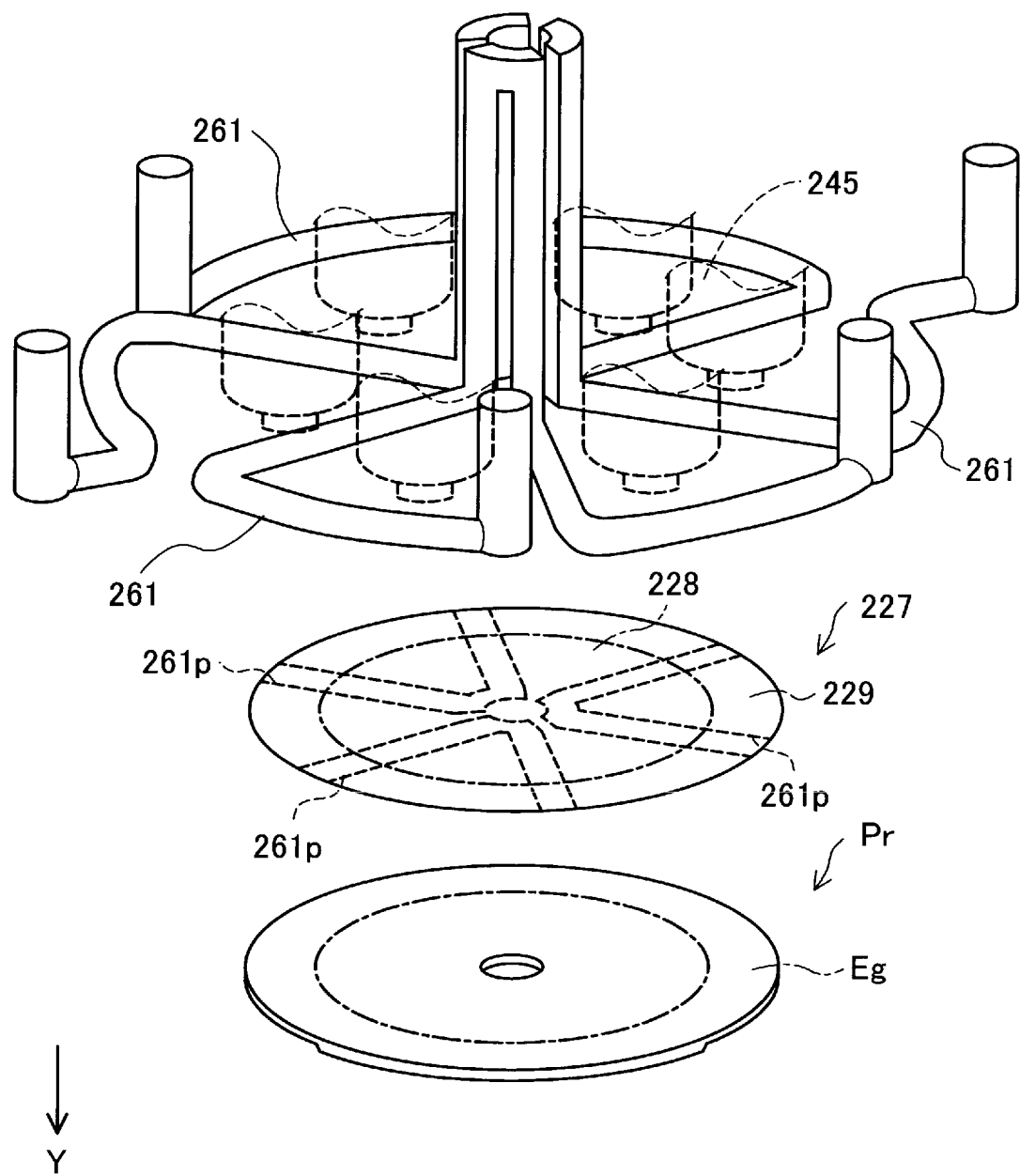
FIG. 13 is a diagram for explaining a relationship between a shape of a molded article and the arrangement of the cooling flow paths.

FIG. 13 is a diagram for explaining a relationship between the shape of a molded article Pr and the arrangement of the cooling flow paths 261 in the present embodiment. In an upper part of FIG. 13, there are shown the cooling flow paths 261. In a middle part of FIG. 13, there are shown cooling flow paths 261p projected on the cavity compartment surface 227. In a lower part of FIG. 13, there is shown the molded article Pr molded by the molding tool 220 in the present embodiment. As shown in the lower part of FIG. 13, the molded article Pr is a component shaped like a disk having an opening in a central portion, and an outer circumferential edge part Eg of the molded article Pr has a smaller thickness compared to a portion at an inner side of the outer circumferential edge part Eg. Therefore, as shown in a middle area of FIG. 7 and FIG. 13, when viewed along the Z direction, an outer circumferential edge part of the cavity compartment surface 227 corresponds to the second surface 229, and a portion at the inner side of the second surface 229 corresponds to the first surface 228.

The cooler 260 is configured so that the cooling performance with respect to the first surface 228 becomes higher than the cooling performance with respect to the second surface 229 when viewed along the Z direction. As shown in the middle area of FIG. 13, in the present embodiment, by arranging the cooling flow paths 261p more thickly in the first surface 228 than in the second surface 229 when being projected on a surface perpendicular to the Y direction, it is realized that the cooling performance of cooling the first surface 228 is higher than the cooling performance of cooling the second surface 229.

According to the injection molding device 100 related to the first embodiment described hereinabove, the end surface 233 of the stationary mold 230 has the first region R1 having the surface between the first gate opening 171 and the second gate opening 172 when viewed along the Y direction, and the second region R2 different from the first region R1, and the cooler 260 is configured so that the cooling performance with respect to the first region R1 is higher than the cooling performance with respect to the second region R2. Thus, since the cooling performance of the cooler 260 with respect to the first region R1 is higher than the cooling performance with respect to the second region R2, the surface between the first gate opening 171 and the second gate opening 172 is intensively cooled. Therefore, it is possible to appropriately cool the area where the hot runners are close to each other out of the end surface 233 of the stationary mold 230, and thus, it is possible to prevent the quality of the molded article from being affected. More particularly, it is possible to prevent whitening, deformation, and so on of the molded article due to the fact that the molded article is not sufficiently solidified when, for example, opening the mold or being demolded. Further, for example, when evenly cooling the end surface 223 of the stationary mold 230, in particular, the cavity compartment surface 227, there is a possibility that the molding quality degrades due to an excessive drop of the temperature of the molding material to be injected in the cavity 221. In the present embodiment, since the first region R1 and the second region R2 are cooled with the respective performances different from each other, it is possible to prevent such degradation in molding quality.

Further, in the present embodiment, the cooler 260 has the cooling flow paths 261 through which the cooling medium flows, and when being projected on a surface perpendicular to the Y direction, the cooling flow paths 261 are arranged in the first region R1 more thickly than in the second region R2. Thus, it becomes easy for the cooling medium to aggregate around the first region R1, and it is possible to encourage the heat exchange between the stationary mold 230 and the cooling medium around the first region R1. Therefore, it is possible to make the cooling performance with respect to the first region R1 higher than the cooling performance with respect to the second region R2 with a simple method.

Further, in the present embodiment, the cooler 260 has the plurality of cooling flow paths 261, and the cooling flow paths 261 have the respective entrance parts different from each other, and the respective exit parts different from each other. Thus, it is possible to reduce the length from the entrance part to the exit part of the cooling flow path 261 compared to, for example, when disposing only a single cooling flow path 261, and therefore, it is possible to prevent a temperature difference from occurring between the entrance part and the exit part of the cooling flow path 261. Further, for example, it is possible to individually control the flow rate and the temperature of the cooling medium in each of the cooling flow paths 261. Therefore, there increases the possibility that the stationary mold 230 can more appropriately be cooled by the cooler 260.

Further, in the present embodiment, the first gate opening 171 and the second gate opening 172 are communicated with the same cavity 221. In such an aspect, there is a tendency that the distance between the first gate opening 171 and the second gate opening 172 becomes shorter compared to when, for example, the first gate opening 171 and the second gate opening 172 are communicated with respective cavities different from each other. Therefore, a portion located between the first gate opening 171 and the second gate opening 172 is apt to become high in temperature, but it is possible to effectively cool such a portion located between the first gate opening 171 and the second gate opening 172 due to the cooler 260 described above. Therefore, it is possible to effectively prevent the quality of the molded article from being affected.

Further, in the present embodiment, when viewed along the Y direction, out of the portion cooled by the cooler 260 of the stationary mold 230, at least a part of the portions overlapping the first region R1 is formed of a member having higher thermal conductivity than that of the member forming the portions overlapping the second region R2. Therefore, it is possible to more efficiently cool the first region R1 with the cooler 260. Further, it is possible to make the cooling performance with respect to the first region R1 higher than the cooling performance with respect to the second region R2 with a simple method.

Further, in the present embodiment, the cavity compartment surface 227 has the first surface 228, and the second surface 229 shorter in distance from the movable mold 255 when the mold clamping is performed than the first surface 228, and the cooler 260 is configured so that the cooling performance with respect to the first surface 228 becomes higher than the cooling performance with respect to the second surface 229. Thus, it is possible to prevent the temperature of the molding material located at a place where the distance in the Y direction between the stationary mold 230 and the movable mold 255 is shorter out of the molding material located in the cavity 221 from lowering. Therefore, it is possible to prevent the molding quality of the molded article having a thin-wall portion from degrading.

B. Second Embodiment

Figure 14:
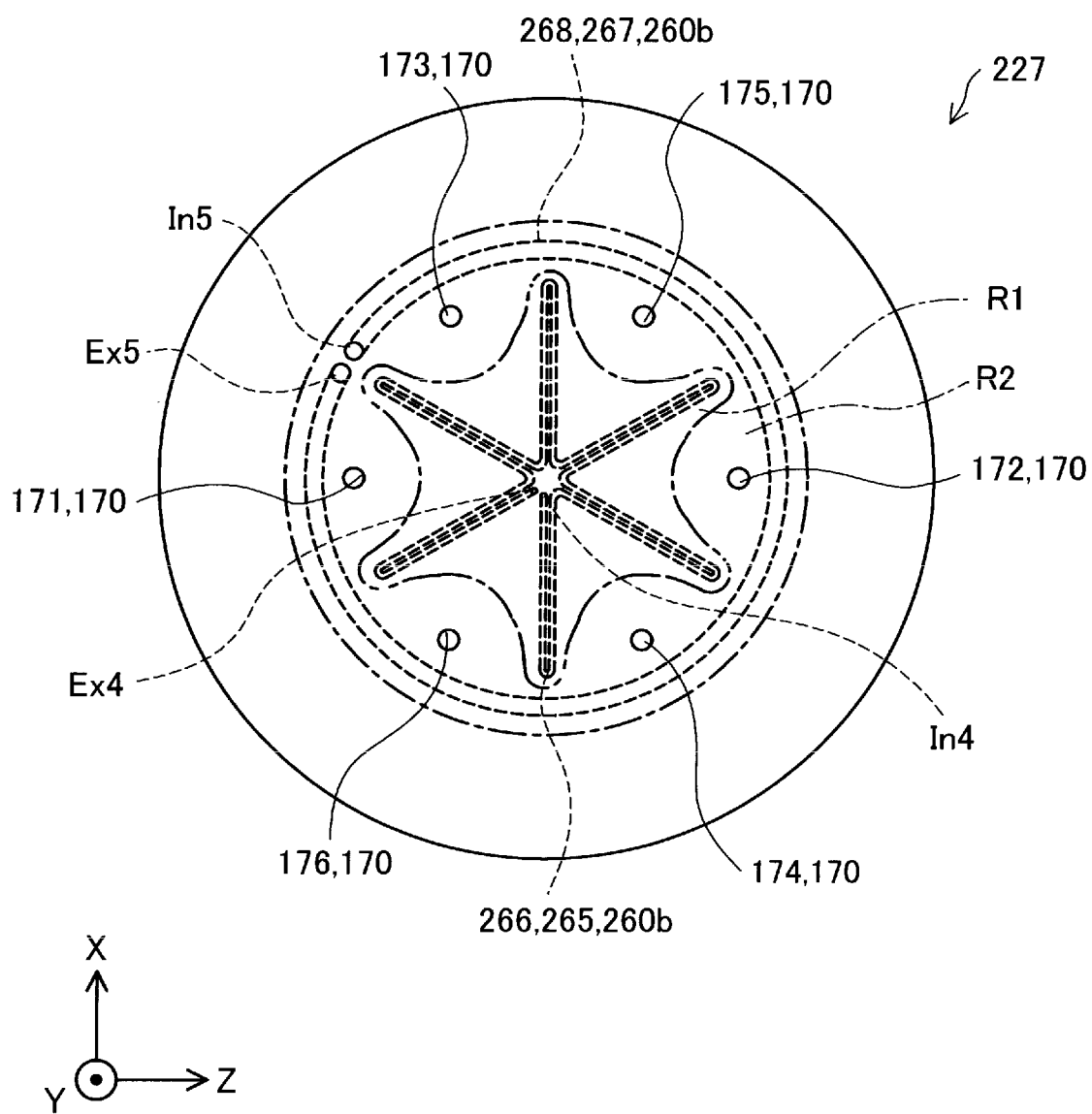
FIG. 14 is a diagram for explaining an arrangement of cooling flow paths in a second embodiment.

FIG. 14 is a diagram for explaining an arrangement of cooling flow paths 261b of a cooler 260b in a second embodiment. FIG. 14 shows an appearance of the cavity compartment surface 227 of a cooling plate 250b viewed in the −Y direction. FIG. 14 schematically shows positions of the cooling flow paths 261b in the X direction and the Z direction. In the present embodiment, the controller 500 controls the cooler 260b so that the cooling performance with respect to the first region R1 becomes higher than the cooling performance with respect to the second region R2. Out of the configuration of the injection molding device 100 and the molding tool 220, the portions not particularly described are substantially the same as those in the first embodiment.

In the present embodiment, the cooler 260b has a first cooler 265 for cooling the first region R1, and a second cooler 267 for cooling the second region R2. In the present embodiment, the first cooler 265 has a fourth cooling flow path 266 arranged so as to overlap the first region R1 when viewed along the Y direction, and a chiller not shown and coupled to an entrance part and an exit part of the fourth cooling flow path 266. The second cooler 267 has a fifth cooling flow path 268 arranged so as to overlap the second region R2 when viewed along the −Y direction, and a chiller not shown and coupled to an entrance part and an exit part of the fifth cooling flow path 268. The entrance part and the exit part of the fourth cooling flow path 266 and the entrance part and the exit part of the fifth cooling flow path 268 are different from each other, respectively. More particularly, the fourth cooling flow path 266 has a fourth entrance part In4 and a fourth exit part Ex4. The fifth cooling flow path 268 has a fifth input part In5 and a fifth exit part Ex5. Further, the controller 500 is configured so as to be able to individually control the first cooler 265 and the second cooler 267. It should be noted that in the present embodiment, the density of the fourth cooling flow path 266 in the first region R1 and the density of the fifth cooling flow path 268 in the second region R2 are substantially the same as each other.

In the present embodiment, the controller 500 makes an output of the chiller of the first cooler 265 higher than an output of the chiller of the second cooler 267 to thereby make the cooling performance of cooling the first region R1 higher than the cooling performance of cooling the second region R2.

According to the second embodiment described hereinabove, the controller 500 individually controls the first cooler 265 for cooling the first region R1 and the second cooler 267 for cooling the second region R2 so that the cooling performance with respect to the first region R1 becomes higher than the cooling performance with respect to the second region R2. Therefore, it is possible to make the cooling performance with respect to the first region R1 higher than the cooling performance with respect to the second region R2 with a simple method.

It should be noted that in other embodiments, it is possible to individually control the first cooler 265 and the second cooler 267 so that the cooling performance with respect to the first region R1 becomes higher than the cooling performance with respect to the second region R2 as described above in addition to, for example, making the density of the cooling flow paths 261b in the first region R1 higher than the density of the cooling flow paths 261b in the second region R2 as described in the first embodiment.

Further, the controller 500 controls the output of the first cooler 265 to be higher than the output of the second cooler 267 in the second embodiment, but is not required to control the output of the first cooler 265 and the second cooler 267 in such a manner in other embodiments. For example, when the first cooler 265 and the second cooler 267 each have a temperature controller formed of a heater, and the temperature of the medium to be supplied to the fourth cooling flow path 266 and the fifth cooling flow path 268 is controlled by the temperature controllers, it is possible to make the cooling performance of cooling the first region R1 higher than the cooling performance of cooling the second region R2 by making output of the temperature controller of the first cooler 265 lower than output of the temperature controller of the second cooler 267.

C. Other Embodiments (C-1) In the embodiments described above, it is possible for the cooling flow paths 261 of the cooler 260 to divisibly be configured. In this case, it is possible to form the cooling flow paths 261 with a plurality of members configured to be detachable from each other. More particularly, for example, it is possible to divisibly configure the cooling flow paths 261 by fixing the first bonding member J1 through the fifth bonding member J5 described with reference to FIG. 13 to each other with fixation tools such as bolts instead of the metal-joining to form the cooling plate 250. In this case, it is preferable for seams of the groove parts and the holes provided to the members to be sealed in a liquid-tight manner so that a liquid-tight property of the cooling flow paths 261 is ensured when the members are fixed to each other. As described above, by divisibly configuring the cooling flow paths 261, it is possible to more easily clean the inside of the cooling flow paths 261, and therefore, it is possible to enhance the easiness of maintenance of the cooling flow paths 261.

(C-2) In the embodiments described above, it is possible for the cooling flow paths 261 of the cooler 260 to be formed with three-dimensional modeling. In this case, it is possible to manufacture a three-dimensional shaped article in which the cooling flow paths 261 are formed using, for example, material extrusion (ME), and use the three-dimensional shaped article as the cooling plate 250. In this case, by modeling the three-dimensional shaped article using, for example, a metal material or a ceramic material as a chief material, it is possible to manufacture the cooling plate 250 excellent in strength and heat resistance. The "chief material" means the material playing a central role for forming the shape of the three-dimensional shaped article, and means the material having a content rate no lower than 50% by weight in the three-dimensional shaped article. More particularly, by plasticizing a material including, for example, metal powder or ceramic powder, and a binder to generate the molding material, and then ejecting the molding material thus generated on a stage, it is possible to manufacture the three-dimensional shaped article. It is possible for the three-dimensional shaped article thus manufactured to be used as the cooling plate 250 after being subject to sintering and polishing. It should be noted that it is possible to adopt an optical modeling process, an inkjet process, or the like as a process of the three-dimensional modeling instead of the material extrusion.

By forming the cooling flow paths 261 using the three-dimensional modeling, it is possible to more easily form the cooling flow paths 261 even when the cooling flow paths 261 have complicated flow path shapes. Further, it is possible to more easily form the cooling flow paths 261 integrally configured. For example, when providing the cooling flow paths 261 to a member having a columnar shape such as a circular cylinder as in the cooling plate 250 in the embodiments described above, it is normally difficult to make multiple changes in the direction in which the cooling flow path 261 extends into a direction crossing an axial direction and a planar direction of that member inside that member. Further, it is more difficult to form the cooling flow paths 261 having such flow path shapes as a single unit. According to the three-dimensional modeling, it is possible to more easily form such cooling flow paths 261 as described above.

(C-3) In the embodiments described above, the gate openings 170 are arranged so that the gate openings 170 respectively form vertexes of a substantially regular hexagon when viewed along the –Y direction. In contrast, the gate openings 170 are not required to be arranged in such a manner. For example, it is possible for the gate openings 170 to be arranged to form vertexes of other polygonal shapes, or linearly arranged side by side when viewed along the –Y direction. Further, the first region R1 includes portions between the first gate opening 171 and the third gate opening 173 through the sixth gate opening 176 in addition to the portion between the first gate opening 171 and the second gate opening 172 in the embodiments described above, but is not required to include the portions between the first gate opening 171 and the third gate opening 173 through the sixth gate opening 176. Further, the second gate opening 172 is arranged the farthest from the first gate opening 171 out of the gate openings 170 in the embodiments described above, but is not required to be arranged in such a manner, and can be arranged, for example, so as to be adjacent to the first gate opening 171. Further, although the stationary mold 230 is provided with six gate openings 170 in the embodiments described above, the number of the gate openings 170 provided to the stationary mold 230 can be no smaller than two and no larger than five, and can also be no smaller than seven.

(C-4) The first molding material and the second molding material are the materials the same as each other in the embodiments described above, but can be respective materials different from each other. Similarly, the third molding material through the sixth molding material can each be the same material as the first molding material or the second molding material, or can also be different materials. In this case, for example, it is possible for the injection molding device 100 to be provided with a plurality of injection units 140 different from each other for injecting the respective molding materials to the cavity 221 via the respective hot runners and the respective gate openings 170.

(C-5) In the embodiments described above, the cooler 260 has the plurality of cooling flow paths 261, and the cooling flow paths 261 have the respective entrance parts different from each other, and the respective exit parts different from each other. In contrast, for example, the cooling flow paths 261 can be common in the entrance part and the exit part. Further, it is possible for the cooler 260 to have a single cooling flow path 261 alone.

(C-6) The cooler 260 has the cooling flow paths 261 in the embodiments described above, but is not required to have the cooling flow paths 261. In this case, it is possible for the cooler 260 to have, for example, a Peltier element and a power supply for supplying an electric current to the Peltier element. In this case, for example, it is possible to arrange the Peltier element in the cooling plate 250, and supply the electric current from the power supply to the Peltier element so that a surface of the Peltier element close to the end surface 233 absorbs the heat, and a surface of the Peltier element far from the end surface 233 releases the heat. In this case, it is possible to provide, for example, a radiator plate to the cooling plate 250 in order to encourage the heat radiation from the surface of the Peltier element far from the end surface 233.

When making the cooling performance with respect to the first region R1 of the cooler 260 having the Peltier element higher than the cooling performance with respect to the second region R2, for example, it is possible to arrange the Peltier elements in the first region R1 more thickly than in the second region R2 when projected on a surface perpendicular to the mold clamping direction. Further, it is possible to adopt a configuration in which the Peltier element is arranged in the first region R1 but is not arranged in the second region R2. Further, as described in the second embodiment, it is possible for the controller 500 to individually control the first cooler 265 having the Peltier element arranged in the first region R1 and the second cooler 267 having the Peltier element arranged in the second region R2 so that the cooling performance with respect to the first region R1 becomes higher than the cooling performance with respect to the second region R2. More particularly, in this case, for example, the controller 500 makes output of the power supply for supplying the electric current to the Peltier element of the first cooler 265 higher than output of the power supply for supplying the electric current to the Peltier element of the second cooler 267.

(C-7) The first gate opening 171 and the second gate opening 172 are communicated with the same cavity 221 in the embodiments described above, but are not required to be communicated with the same cavity 221. For example, when two or more cavities 221 are compartmented by the stationary mold 230 and the molding tool 220, it is possible for the first gate opening 171 and the second gate opening 172 to be communicated with the respective cavities 221 different from each other. Similarly, the third gate opening 173 through the sixth gate opening 176 can be communicated with the same cavity 221 as the cavity which the first gate opening 171 and the second gate opening 172 are communicated with, or can also be communicated with the cavity 221 different therefrom.

(C-8) In the embodiments described above, when viewed along the mold clamping direction, out of the members cooled by the cooler 260 of the stationary mold 230, at least a part of the protrusion portion P1 overlapping the first region R1 is formed of a member having higher thermal conductivity than that of the member forming the portion P2 overlapping the second region R2. In contrast, the protrusion portion P1 and the portion P2 are not required to be formed of such members, and for example, the protrusion portion P1 and the portion P2 can be formed of members having the same thermal conductivity, or the thermal conductivity of a member forming the protrusion portion P1 can be lower than the thermal conductivity of a member forming the portion P2.

(C-9) In the embodiments described above, the cooler 260 is configured so that the cooling performance with respect to the first surface 228 of the cavity compartment surface 227 becomes higher than the cooling performance with respect to the second surface 229. In contrast, it is possible for the cooler 260 to be configured so that the cooling performance with respect to the first surface 228 and the cooling performance with respect to the second surface 229 become the same as each other, or configured so that the cooling performance with respect to the first surface 228 becomes lower than the cooling performance with respect to the second surface 229.

(C-10) In the embodiments described above, the plasticizer 110 has the flat screw 111. In contrast, it is possible for the plasticizer 110 to have an in-line screw instead of the flat screw 111. In this case, the barrel is formed to have a cylindrical shape housing the in-line screw, and is also called a cylinder in some cases.

(C-11) The injection molding device 100 is the horizontal injection molding device in the embodiments described above, but can also be a vertical injection molding device. Further, it is also possible for the injection unit 140 and the mold clamping device 130 to be arranged side by side in a vertical direction.

D. Other Aspects

The present disclosure is not limited to the embodiments described above, but can be implemented in a variety of aspects within the scope or the spirit of the present disclosure. For example, the present disclosure can also be implemented in the following aspects. The technical features in the embodiments described above corresponding to the technical features in each of the aspects described below can arbitrarily be replaced or combined in order to solve some or all of the problems of the present disclosure, or to achieve some or all of the advantages of the present disclosure. Further, the technical feature can arbitrarily be eliminated unless described in the present specification as an essential element.

(1) According to a first aspect of the present disclosure, there is provided an injection molding device. The injection molding device includes a stationary mold provided with a first gate opening, and a second gate opening different from the first gate opening, a movable mold configured to be mold-clamped against the stationary mold, a first hot runner configured to inject a first molding material in a cavity compartmented by the stationary mold and the movable mold, via the first gate opening, a second hot runner configured to inject a second molding material in the cavity via the second gate opening, and a cooler configured to cool the stationary mold. An end surface opposed to the movable mold out of the stationary mold has a first region having a surface located between the first gate opening and the second gate opening out of the end surface, and a second region different from the first region when viewed along a mold clamping direction. The cooler is configured so that a cooling performance with respect to the first region becomes higher than a cooling performance with respect to the second region.

According to such an aspect, since the cooling performance of the cooler with respect to the first region is higher than the cooling performance with respect to the second region, the surface between the first gate opening and the second gate opening is intensively cooled. Therefore, it is possible to appropriately cool the area where the hot runners are close to each other out of the end surface of the stationary mold, and thus, it is possible to prevent the quality of the molded article from being affected.

(2) In the aspect described above, the cooler may have a cooling flow path through which a cooling medium flows, and the cooling flow paths may be arranged in the first region more thickly than in the second region when projected on a surface perpendicular to the mold clamping direction. According to such an aspect, it becomes easy for the cooling medium to aggregate around the first region, and it is possible to encourage the heat exchange between the stationary mold and the cooling medium around the first region. Therefore, it is possible to make the cooling performance with respect to the first region higher than the cooling performance with respect to the second region with a simple method.

(3) In the aspect described above, the cooler may have a plurality of the cooling flow paths through which a cooling medium flows, and the cooling flow paths may have respective entrance parts different from each other, and respective exit parts different from each other. According to such an aspect, it is possible to reduce the length from the entrance part to the exit part of the cooling flow path compared to when disposing only a single cooling flow path, and therefore, it is possible to prevent a temperature difference from occurring between the entrance part and the exit part of the cooling flow path. Further, for example, it is possible to individually control the flow rate and the temperature of the cooling medium in each of the cooling flow paths. Therefore, there increases the possibility that the stationary mold can more appropriately be cooled by the cooler.

(4) In the aspect described above, there may further be included a controller configured to control the cooler, wherein the cooler may have a first cooler configured to cool the first region and a second cooler configured to cool the second region, and the controller may individually control the first cooler and the second cooler so that the cooling performance with respect to the first region becomes higher than the cooling performance with respect to the second region. According to such an aspect, it is possible to make the cooling performance with respect to the first region higher than the cooling performance with respect to the second region with a simple method.

(5) In the aspect described above, the first gate opening and the second gate opening may be communicated with the same cavity. In such an aspect, the portion between the first gate opening and the second gate opening is apt to become higher in temperature compared to when, for example, the first gate opening and the second gate opening are communicated with respective cavities different from each other, but it is possible for the cooler to effectively cool such a portion between the first gate opening and the second gate opening. Therefore, it is possible to effectively prevent the quality of the molded article from being affected.

(6) In the aspect described above, when viewed along the mold clamping direction, out of a portion cooled by the cooler of the stationary mold, at least a part of a portion overlapping the first region may be formed of a member higher in thermal conductivity than a member forming a portion overlapping the second region. According to such an aspect, it is possible to more efficiently cool the first region with the cooler. Further, it is possible to make the cooling performance with respect to the first region higher than the cooling performance with respect to the second region with a simple method.

(7) In the aspect described above, a surface configured to compartment the cavity out of the end surface may have a first surface, and a second surface shorter in distance from the movable mold when mold clamping is performed than the first surface, and the cooler may be configured so that a cooling performance with respect to the first surface becomes higher than a cooling performance with respect to the second surface. According to such an aspect, it is possible to prevent the temperature of the molding material located at a place where the distance in the mold clamping direction between the stationary mold and the movable mold is shorter out of the molding material located in the cavity from lowering. Therefore, it is possible to prevent the molding quality of the molded article having a thin-wall portion from degrading.

(8) According to a second aspect of the present disclosure, there is provided a molding tool. The molding tool includes a stationary mold provided with a first gate opening, and a second gate opening different from the first gate opening, a movable mold, a first opening part configured so that a first hot runner configured to inject a first molding material in a cavity compartmented by the stationary mold and the movable mold, via the first gate opening, is inserted in the first opening part, a second opening part configured so that a second hot runner configured to inject a second molding material in the cavity via the second gate opening, is inserted in the second opening part, and a cooler configured to cool the stationary mold. An end surface close to the movable mold out of the stationary mold has a first region having a surface located between the first gate opening and the second gate opening out of the end surface, and a second region different from the first region when viewed along a mold clamping direction. The cooler is configured so that a cooling performance with respect to the first region becomes higher than a cooling performance with respect to the second region.

What is claimed is:

1. An injection molding device comprising:
    a stationary mold having a cooling plate provided in an end part of the stationary mold, the cooling plate having a first gate opening and a second gate opening different from the first gate opening, the cooling plate facing a cavity, the cooling plate being configured with a base and a protrusion portion upwardly extending from a center of the base, an end part of the cooling plate and the end part of the stationary mold being coplanar;
    a movable mold configured to be mold-clamped against the stationary mold along a first direction;
    a first hot runner configured to inject a first molding material in the cavity formed by the stationary mold and the movable mold, via the first gate opening;
    a second hot runner configured to inject a second molding material in the cavity via the second gate opening; and
    a cooler having a plurality of cooling paths, the cooler being configured to cool the stationary mold, wherein
    an end surface opposed to the movable mold of the stationary mold has a first region having a surface located between the first gate opening and the second gate opening and a second region different from the first region when viewed along the first direction, and
    the protrusion portion of the cooling plate is located in the first region, and the plurality of cooling paths extend in the protrusion portion along the first direction and continuously extend in the base of the cooling plate along a second direction perpendicular to the first direction.

2. The injection molding device according to claim 1, wherein
    a cooling medium flows in the plurality of cooling paths, and
    a density of the plurality of cooling paths that are arranged in the first region is higher than a density of the plurality of cooling paths that are arranged in the second region when viewed along the second direction.

3. The injection molding device according to claim 1, wherein
    a cooling medium flows in the plurality of cooling paths, and
    the plurality of cooling paths have respective entrance parts different from each other, and respective exit parts different from each other.

4. The injection molding device according to claim 1, further comprising:
    a controller configured to control the cooler, wherein
    the cooler has a first cooler configured to cool the first region and a second cooler configured to cool the second region, and
    the controller individually controls the first cooler and the second cooler so that the cooling performance with respect to the first region becomes higher than the cooling performance with respect to the second region.

5. The injection molding device according to claim 1, wherein
    the first gate opening and the second gate opening are communicated with the cavity in common.

6. The injection molding device according to claim 1, wherein
    when viewed along the first direction, at least a part of a portion of the cooler overlapping the first region is formed of a member higher in thermal conductivity than a member forming a portion of the cooler overlapping the second region.

7. The injection molding device according to claim 1, wherein
    a part of the end surface directly facing the cavity is defined as a first surface, and a part of the end surface is defined as a second surface,
    a distance between the second surface and the movable mold is shorter than a distance between the first surface and the movable mold when the movable mold is mold-clamped to the stationary mold, and
    the cooler is configured so that a cooling performance with respect to the first surface becomes higher than a cooling performance with respect to the second surface.

8. A molding tool comprising:
    a stationary mold having a cooling plate provided in an end part of the stationary mold, the cooling plate having a first gate opening and a second gate opening different from the first gate opening, the cooling plate facing a cavity, the cooling plate being configured with a base and a protrusion portion upwardly extending from a center of the base, an end part of the cooling plate and the end part of the stationary mold being coplanar;

a movable mold configured to be mold-clamped against the stationary mold along a first direction;

a first opening part in which a first hot runner is inserted, the first hot runner being configured to inject a first molding material in a cavity formed by the stationary mold and the movable mold via the first gate opening;

a second opening part in which a second hot runner is inserted, the second hot runner being configured to inject a second molding material in the cavity via the second gate opening; and a cooler having a plurality of cooling paths, the cooler being configured to cool the stationary mold, wherein an end surface opposed to the movable mold of the stationary mold has a first region having a surface located between the first gate opening and the second gate opening and a second region different from the first region when viewed along the first direction, and the protrusion portion of the cooling plate is located in the first region, and the plurality of cooling paths extend in the protrusion portion along the first direction and continuously extend in the base of the cooling plate along a second direction perpendicular to the first direction.

* * * * *